May 16, 1944.  H. H. FREEMAN  2,349,159
STOP FOR LATHES
Filed June 23, 1942
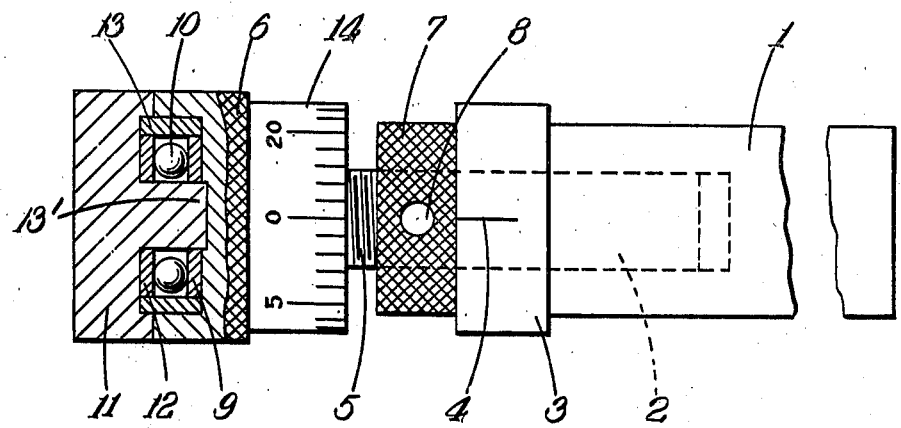
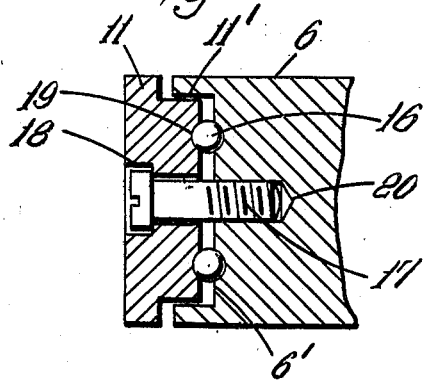
Inventor
Harry H. Freeman Patented May 16, 1944

2,349,159

UNITED STATES PATENT OFFICE 2,349,159

STOP FOR LATHES

Harry Howard Freeman, Teddington, England

Application June 23, 1942, Serial No. 448,137
In Great Britain June 19, 1941

1 Claim. (Cl. 33—164)

This invention relates to adjustable stops for capstan and similar lathes.

According to the present invention, an adjustable stop, for a capstan or similar lathe, provided with a rotatable member connected to a supporting member adapted to be secured in the lathe, is characterised in that a micrometer screw is secured to an adjustable or adjusting member, on which the rotatable member is rotatably mounted, this screw engaging with a corresponding screw-threaded bore in the supporting member.

The supporting member may be machined in cylindrical, tapered or other form so as to fit the turret or tailstock of the lathe.

A ball or other antifriction bearing is preferably provided between the rotatable and adjusting members.

An internally threaded locking member may be mounted on the micrometer screw, this locking member being adapted to be tightened against the end face of the supporting member so as to lock the micrometer screw in the adjusted position.

A scale and mark or pointer may be provided on the adjusting member and on the supporting member for facilitating the adjustment of the adjusting member.

The invention will now be described by way of example with reference to the accompanying drawing, wherein:

Figure 1 shows a plan view, partly in section, of an adjustable stop for a capstan or similar lathe.

Figure 2 shows a sectional view of a modified form of ball bearing arrangement.

The adjustable stop shown in the drawing is provided with a supporting member 1 which is machined in cylindrical, tapered or other form so as to fit the turret or tailstock of a capstan or other lathe.

At the end remote from the end adapted to be fitted into the turret or the like, the supporting member 1 is provided with an axial bore 2 which extends partly or wholly through the supporting member 1. This end of the supporting member 1 is enlarged slightly, as shown at 3, this enlarged portion 3 being provided with a suitable mark 4, for adjusting purposes.

The bore 2 is provided with a micrometer screw-thread for the reception of a corresponding micrometer screw 5, which carries at its free end an adjusting member 6. By way of example the micrometer screw has a pitch of .025 of an inch.

On the micrometer screw is mounted a locking member 7 which may be in the form of a knurled locking ring, preferably provided with one or more holes 8 for engagement by a tommy bar or other suitable tool. The locking member 7 may also be in the form of a nut.

The end face of the adjusting member 6, remote from the micrometer screw 5, is recessed so as to form one race 9 of a ball or other antifriction bearing 10.

A rotatable member 11, is provided in one face with a recess to receive the other race 12 of the bearing 10, whilst a sleeve 13 is fixed in the recess of the member 6. The sleeve 13 engages freely in the recess of the rotatable member 11 so as to enable the latter to rotate freely on the bearing 10.

As shown, the rotatable member 11 is provided with a central axial boss 13' which engages with a corresponding recess in the member 6 for the purpose of centering the rotatable member 11 relatively to the member 6.

In the modified form of construction shown in Figure 2, the connection between the members 6 and 11 is effected by providing the member 11 with a boss 11' which engages freely with a recess 6' in the member 6. The boss 11' and recess 6' are provided with ball races for receiving balls 16. A screw 17, having a head 18 sunk in a recess 19 in the outer face of the member 11, passes freely through the member 11 and engages with a screw threaded hole 20 in the member 6.

On the adjusting member 6 is provided a peripheral scale 14, preferably divided into 25 equal parts, for co-operation with the mark 4 on the supporting member 1.

As the mark 4 is at some distance from the scale 14 and the member 7 is located between them, it is generally preferred to secure a pointer to the enlarged portion 3 so as to extend towards the scale 14, in order to facilitate the adjustment of the stop.

By means of a device as above described, the adjusting member 6, and thus the rotatable member 11, can be adjusted to .001 of an inch.

It will, however, be understood that within limits and according to the pitch of the micrometer screw and the graduations of the scale, coarser or finer adjustments can be made.

After the necessary adjustment has been made the locking member 7 is tightened against the face of the supporting member 1 so as to lock the micrometer screw 5 in its adjusted position.

When the device has been adjusted and work to be machined is fed up to the rotatable member 11, the latter revolves with the work thus preventing the face of the work from being scored.

Should the work not be fed tightly in contact with the rotatable member 11 or slip back, this is noticed at once as the rotatable member 11 ceases to rotate or rotates spasmodically.

What I claim is:

An adjustable stop for a lathe, comprising a supporting member to be secured in a lathe, said member being formed with an axial bore having a micrometer thread, a micrometer screw cooperating with the micrometer thread in said bore, an adjusting member secured directly to that end of the micrometer screw remote from said supporting member, the end of the adjusting member towards said supporting member having a peripheral scale marking indicating rotative adjustments of said micrometer screw, a lock nut on said micrometer screw between said supporting member and said adjusting member, said lock nut cooperating with said supporting member to lock said micrometer screw in adjusted position, means on said supporting member to cooperate with said scale for reading purposes, and a freely rotatable head on said adjusting member remote from the scale marking.

HARRY HOWARD FREEMAN